United States Patent
Valentas et al.

(10) Patent No.: US 10,981,145 B2
(45) Date of Patent: Apr. 20, 2021

(54) COMPOSITIONS AND METHODS FOR REMOVING AMMONIA FROM GAS

(71) Applicant: REGENTS OF THE UNIVERSITY OF MINNESOTA, Minneapolis, MN (US)

(72) Inventors: Kenneth J. Valentas, Minneapolis, MN (US); Gabriel Gerner, Minneapolis, MN (US); Scott Plewka, Minneapolis, MN (US); Zachary Pursell, Minneapolis, MN (US)

(73) Assignee: REGENTS OF THE UNIVERSITY OF MINNESOTA, Minneapolis, MN (US)

(*) Notice: Subject to any disclaimer, the term of this patent is extended or adjusted under 35 U.S.C. 154(b) by 95 days.

(21) Appl. No.: 16/388,112

(22) Filed: Apr. 18, 2019

(65) Prior Publication Data
US 2019/0321803 A1  Oct. 24, 2019

Related U.S. Application Data

(60) Provisional application No. 62/660,389, filed on Apr. 20, 2018.

(51) Int. Cl.
*B01D 53/58* (2006.01)
*B01J 20/22* (2006.01)
*B01J 20/30* (2006.01)
*C01C 1/12* (2006.01)

(52) U.S. Cl.
CPC .............. *B01J 20/22* (2013.01); *B01D 53/58* (2013.01); *B01J 20/3078* (2013.01); *C01C 1/12* (2013.01)

(58) Field of Classification Search
CPC .................................. C01C 1/12; B01D 53/58
See application file for complete search history.

(56) References Cited

U.S. PATENT DOCUMENTS 8,999,030 B2   4/2015   Schendel et al.

OTHER PUBLICATIONS

Boehm, "Some aspects of the surface chemistry of carbon blacks and other carbons" Carbon, 1994; 32(5):759-69.
Oickle et al., "Standardization of the Boehm titration: Part II. Method of agitation, effect of filtering and dilute titrant" Carbon, Oct. 2010; 48(12): 3313-3322.

*Primary Examiner* — Stuart L Hendrickson
(74) *Attorney, Agent, or Firm* — Mueting Raasch Group

(57) ABSTRACT

Disclosed herein are methods of controlling the amount of carboxyl groups attached to a hydrochar, the methods including subjecting a composition that includes a stover composition to hydrothermal carbonization to form a hydrochar, wherein the amount of carboxyl groups attached to the hydrochar can be controlled by the amount of lipids in the composition. Methods of removing ammonia from a gas using disclosed hydrochars and the hydrochars themselves are also disclosed.

10 Claims, 5 Drawing Sheets

US 10,981,145 B2

COMPOSITIONS AND METHODS FOR REMOVING AMMONIA FROM GAS

PRIORITY

This application claims priority to U.S. Provisional Application No. 62/660,389, filed on Apr. 20, 2018 entitled "COMPOSITIONS AND METHODS FOR REMOVING AMMONIA FROM GAS" the disclosure of which is incorporated herein by reference thereto in its entirety.

SUMMARY

Disclosed herein are methods of controlling the amount of carboxyl groups attached to a hydrochar, the methods including subjecting a composition that includes a stover composition to hydrothermal carbonization to form a hydrochar, wherein the amount of carboxyl groups attached to the hydrochar can be controlled by the amount of lipids in the composition.

Also disclosed are methods of removing ammonia from a gas, the methods including subjecting a composition that includes a stover composition to hydrothermal carbonization to form a hydrochar, the composition comprising an amount of lipids to provide a carboxyl group content in the hydrochar of not less than 0.3 millimoles (mmol) carboxyl groups per gram of hydrochar; and contacting the gas with the hydrochar, whereby the ammonia is adsorbed onto the hydrochar.

Also disclosed are articles that include a hydrochar produced from a composition that includes a stover compositions, the hydrochar having a carboxyl group content of not less than 0.3 millimoles (mmol) carboxyl groups per gram of composition.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE FIGURES

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
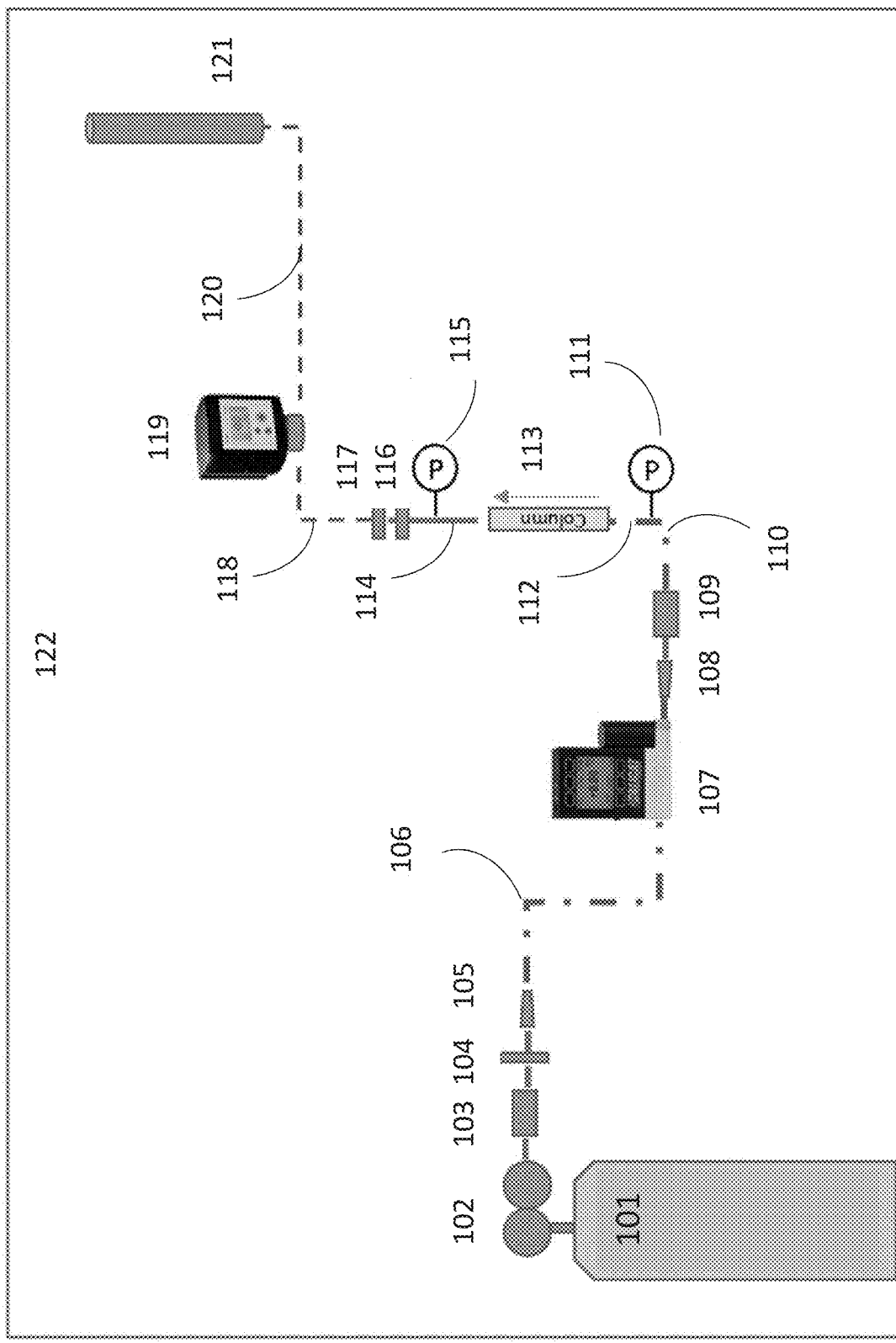
FIG. 1 is a diagram of an illustrative Fixed Bed Adsorption Column Set-up.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like. For example, a conductive trace that "comprises" silver may be a conductive trace that "consists of" silver or that "consists essentially of" silver.

As used herein, "consisting essentially of," as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Use of "first," "second," etc. in the description above and the claims that follow is not intended to necessarily indicate that the enumerated number of objects are present. For example, a "second" substrate is merely intended to differentiate from another infusion device (such as a "first" substrate). Use of "first," "second," etc. in the description above and the claims that follow is also not necessarily intended to indicate that one comes earlier in time than the other.

As used herein "ammonia" refers to the chemical moiety $NH_3$. Ammonia typically exists as a gas at ambient temperatures and pressures. Ammonia can be present at variable levels in the atmosphere and various environments (e.g., within buildings, etc.).

As used herein, a "carboxyl group" refers to the chemical moiety —C(=O)OH, which can also be described as an organic functional group consisting of a carbon atom double bonded to an oxygen atom and single bonded to a hydroxyl group. As used herein, a "carboxylic acid" is an organic compound that includes a carboxyl group, e.g., R—C(=O)OH, where R refers to the rest of the molecule. The terms "carboxylic group" or "carboxylic acid group" are used interchangeably with "carboxyl group" throughout.

As used herein, a "fatty acid" is a molecule that includes a carboxyl group and an aliphatic portion (a chain of carbon atoms, which can include single, double, triple or a combination thereof bonds). Most naturally occurring fatty acids have an unbranched chain and an even number of carbon atoms, e.g., from 4 to 28.

As used herein, "lipids" is used as a synonym for fats and refers to triglycerides. which are a subgroup of a larger group.

As used herein, "hydrochar" refers to a coal like material produced from biomass after it undergoes a hydrothermal carbonization (HTC) treatment at high temperature and pressure.

As used herein, "hydrothermal carbonization" or "HTC" is a thermochemical process that can be applied to wet or dry biomass to produce a coal like solid product, e.g., a hydrochar.

As used herein, "stover" refers to the leaves and stalks (e.g., plant material) of field crops, such as corn (maize), sorghum, oats, barley, kenza, soybean, rice, wheat straws, etc. that are commonly left in a field after harvesting the grain.

Disclosed herein are compositions and methods that can be utilized to remove ammonia gas from a gas composition that contains ammonia gas, for example an atmospheric sample. This technology can address unwanted gaseous ammonia pollution, by contacting it at ambient temperatures and pressures with the hydrochar to capture it. One advantage of this technology over other options is the relatively low cost of the hydrochar material. Useful hydrochars can be produced from widely available agricultural residues. The presence of some amount of carboxyl groups on the hydrochar surface enhances ammonia capture.

Useful hydrochars can be prepared from any number of different types of biomass. In some embodiments, useful hydrochars can be prepared from corn based or containing biomass. Specific illustrative types of corn containing biomasses include, for example corn stover, condensed distillers solubles (CDS), which is a byproduct of ethanol production from corn, spent brewers grains, which is a waste stream from beer production, or any combination thereof. In some embodiments, the biomass can have components added thereto before, during, or both HTC. For example, oils such as vegetable oil can be added to biomass, metal chlorides can be added to biomass, or a combination thereof. It is thought, but not relied upon, based on various experiments outlined herein, that the presence of lipids (e.g., corn oil) in the biomass or added to the biomass may be hydrolyzed to fatty acids during HTC, resulting in an advantageous level of carboxyl groups in the hydrochar.

It is thought, but not relied upon, based on various experiments outlined herein, that relatively higher levels of carboxyl groups on the hydrochar can provide advantageous levels of ammonia absorption. In some embodiments, the amount of carboxyl groups present on the hydrochar can be analyzed. In some embodiments, useful hydrochars can have not less than 0.3 millimoles (mmol) carboxyl groups per gram of hydrochar, or not less than 0.4.

In some embodiments, the amount of carboxyl groups present on the surface of the hydrochar material can be determined using known methods. An example of such a method includes, for example a Boehm titration (see, e.g., Oickle, A. et al. (2010) Standardization of the Boehm titration: Part II. Method of agitation, effect of filtering on dilute titrant. Carbon 48 (2010) 3313-3322.). In some embodiments, the amount of carboxyl groups present on the surface of the hydrochar material could also be determined using other analytical testing methods such as X-ray spectroscopy for example.

Also disclosed herein are methods of forming materials. The methods include HTC treatments on biomass to form hydrochars. In some embodiments, the methods include addition of one or more lipids to the biomass. Addition of lipids before, during (or both before and during) HTC treatment increases the amount of carboxyl groups on the surface of the hydrochar, which can make them more effective at adsorbing ammonia from a gas.

Also disclosed herein are methods of removing ammonia from a gas stream. Such methods include contacting the gas stream with a disclosed hydrochar. The conditions at which the gas stream contacts the hydrochar can include various temperatures, pressures, etc. In some embodiments, the gas stream can be contacted with the hydrochar at ambient atmospheric conditions (e.g., room temperature and ambient pressures). In some embodiments, such methods can include an optional step of desorbing ammonia adsorbed on the hydrochar and recovering it for other uses.

Possible applications for disclosed composition and methods can include, for example, agricultural field applications, in concentrated animal feeding operations (CAFO), or as cat litter, for example. To reduce losses of ammonia on fields the hydrochar could be applied prior to ammonia injection. During ammonia application with the commonly used injection method some of the applied ammonia volatilizes and is lost. This loss of ammonia can be a concern because of the monetary cost of the wasted ammonia and the negative environmental impact of ammonia emissions. Another possible application for an ammonia sorbing hydrochar is as a low cost air filter in CAFOs. The air quality in CAFOs can be very poor which is detrimental to the animals and also workers, with ammonia as a primary harmful gas. Also, due to ammonia being a nuisance odor in households this material could be a cat litter component.

Multiple hydrothermal carbonization (HTC) treatments were carried out to produce hydrochars with a high capacity to adsorb ammonia at ambient temperature and pressure. Multiple HTC methods were found to be successful in producing hydrochars with higher carboxyl surface group concentration including, for example a corn stover and vegetable oil combination; a corn stover modified by metal chloride hydrochar. Hydrochars produced from two untreated feedstocks were also effective. A sample of condensed distillers solubles (CDS), which is a byproduct of ethanol production from corn, had high ammonia sorption if it included oil from the process. A different sample of CDS which was taken after an oil separation process step did not have a similar level of performance. Another feedstock which yielded a high performing hydrochar was spent brewers grains which are a waste stream from beer production. Based on these results it is postulated this could be due to the presence of lipids (corn oil) in the samples and that these are hydrolyzed to fatty acids that are incorporated into the hydrochar during hydrothermal carbonization resulting in carboxyl groups being added to the char.

HTC can be especially effective when applied to wet biomass sources because it does not require an energy intensive drying step before processing the material. Illustrative conditions for HTC are a temperature of 180° C. to 220° C. applied to biomass in a suspension of water in a sealed pressure vessel for 1-3 hours, with resulting autogenous pressure buildup. The final pressure reached can vary depending on the materials in the reactor, with a typical pressure being approximately 300 psi.

During HTC processing it is thought, but not relied upon, that oil breaks down and produces a hydrochar with carboxyl surface groups. The treatment of specific agricultural residues with hydrothermal carbonization at specific conditions can produce a hydrochar material which advantageously sorbs ammonia gas.

The present disclosure is further illustrated by the following examples. It is to be understood that the particular examples, assumptions and procedures are to be interpreted broadly in accordance with the scope and spirit of the disclosure as set forth herein.

EXAMPLES

Materials

Various biomass types were selected for hydrothermal carbonization treatment including brewers spent grains (19.6% solids, UMN food science lab) corn stover (94.6% solids, UMN Waseca extension) and condensed distillers solubles with and without corn oil (CDS) (28.4% solids, Chippewa Valley Ethanol Company).

Another material tested was Black Pearls 2000 (BP 2000) which is high surface area activated carbon (Cabot Corp) that was tested for ammonia sorption untreated and after nitric acid treatment to evaluate the impact of this treatment on a uniform material as a control.

Metal chlorides used for HTC in situ incorporation were obtained from either Fisher Chemical or Sigma Aldrich. Including: potassium chloride (Fisher Scientific, anhydrous, 99% min) magnesium chloride hexahydrate (Fisher Scientific, hexahydrate, 99% min) and zinc chloride (Sigma Aldrich, anhydrous, 99.99%). Nitric acid utilized for treatments purchased from Macron Fine Chemicals.

Hydrothermal Carbonization—Production of Hydrochar from Biomass

Hydrothermal carbonization (HTC) of each biomass type was performed in a Parr Series 4520, 1 L bench top stirred reactor (Moline, Ill.). Depending on the biomass solids content, a volume of DI water was added to the reactor along with the biomass to achieve a solids content of 5-10%. Additionally, any "in situ" experiments comprise of adding the specific chemical additive to the mixture before the reactor is sealed and treated. The hydrothermal carbonization treatment was initiated by heating the reactor to the set temperature with a heating mantle, and subsequently maintaining the set temperature for the desired reaction period. For all biomass types, with the exception of corn stover, the reaction temperature was set to 225° C. for a 2 hour reaction period beginning when reactor temperature was within 3° C. of set temperature. These conditions result in a pressure of 300-500 psi in the sealed reactor. For HTC of corn stover, 2 different treatments were utilized: the first, deemed "low temperature" treatment, was a 4 hour reaction period at 225° C. and the second, deemed "high temperature" treatment, was a 1 hour period at 220° C. followed immediately by a ramp to 260° C. for an additional 1 hour. The HTC conditions for stover treatment were more severe due to the high cellulosic content of the biomass. Upon completing the reaction period, the reactor and contents were allowed to cool to room temperature.

Two products were collected from the cooled reactor: a solid hydrophobic powder or granular material (hydrochar) and the process water (filtrate). These were separated with vacuum filtration. After the separation, the hydrochar was dried in an oven at 85° C. overnight, while the filtrate was saved in refrigerated storage.

Nitric Acid Treatment

Selected hydrochar samples were treated with nitric acid at various conditions to oxidize the hydrochar surface and investigate the connection between carboxyl groups and ammonia sorption. This highly acidic treatment was applied to study ammonia sorption with high surface acidity hydrochars, but would not be feasible (e.g., it is expensive and somewhat risky) for large scale production due to safety and environmental concerns with the high molarity nitric acid. Hydrochars were combined with nitric acid, either 3M or 6M concentration, at a ratio of 100 g hydrochar per 1 L nitric acid solution. The treatment was conducted either at room temperature (20° C.) or in a hot water bath (90° C.). Treatment times of 1 and 2 hours were examined.

Corn Stover Hydrochar with Oil Addition

An oil addition to corn stover prior to hydrothermal carbonization was investigated as an alternative to nitric acid treatment for producing a char with carboxyl surface groups. Preliminary testing with condensed distillers solubles that included corn oil indicated that oil in the reactor during HTC processing could produce a hydrochar with higher ammonia sorption than a hydrochar produced without oil in the reactor during HTC processing. A dry corn stover feedstock was combined with corn oil with a 10:1 mass ratio and then underwent HTC, and the hydrochar produced was evaluated for ammonia sorption capacity.

Metal Treatment In Situ

In situ metal treatment was accomplished by adding the metal chloride into the reactor prior to HTC treatment with a 1 to 1 mass ratio of metal chloride to dry basis biomass. Analysis of the process water from HTC runs which included metal chloride has found that most of the metal chloride remains in the process water, rather than being attached to the hydrochar. Based on this finding a set of HTC runs was performed in which the process water was recycled and no fresh metal chloride was added to investigate if the metal chloride could be reused.

Boehm Titration Experiment

Because of the importance of carboxyl groups for sorbing ammonia, the Boehm titration method (Boehm H. (1994) Some aspects of the surface chemistry of carbon blacks and other carbons. Carbon 1994; 32:759-769; and Oickle, A. et al. (2010) Standardization of the Boehm titration: Part II. Method of agitation, effect of filtering and dilute titrant. Carbon 48 (2010) 3313-3322) was used to quantitatively determine the amount of these groups present on selected hydrochar samples and subsequently compare the results to hydrochar ammonia sorption capacity. This method is based on the expectation that the carboxyl groups on a material surface will be neutralized by sodium bicarbonate in solution, then the remaining sodium bicarbonate concentration is determined with acid titration. Specifically for this testing a sample of hydrochar was combined with a 0.05M $NaHCO_3$ solution and then titrated with 0.05M HCl solution and 0.05M NaOH solution. Based on the amount of each solution required to reach a neutral pH the amount of carboxyl groups per gram of hydrochar can be calculated.

Fixed Bed Adsorption Column—Adsorption and Desorption

See FIG. 1 for a detailed diagram. A 0.32" I.D. steel tube was used as the vessel for a fixed bed adsorption column to determine the ammonia sorption capacity of a sorbent. Prior to column loading each sorbent was passed through a set of sieves to isolate particles with diameter 150-300 microns.

These samples were then dried in an oven at 105° C. for 18 hours and stored in a desiccator until testing in the column. A target 0.45 g of hydrochar was loaded into the adsorption column by first inserting a ball of steel wool in the bottom of the column to hold the char, and then pouring in the char and finally placing another ball of steel wool above the char to secure it and prevent fluidization of the material. The column was secured into a testing apparatus which consisted of an Alicat MCS-500SCCM-D mass flow controller (Alicat, USA) to supply the system with a constant volume of ammonia gas, 1000 ppm ammonia balance nitrogen, the adsorption column, and a Draeger Polytron 7000 detector equipped with the DragerSensor Ammonia TL (Draeger, Germany) to monitor ammonia concentration out of the column. Pressure drop over the column was monitored during testing and found to be minimal (<2 psi).

In FIG. 1, item 101 represents a container that includes 1000 ppm ammonia with the balance being nitrogen. An illustrative container 101 can include 80l L. Item 102 refers to a gas flow regulator, item 103 an excess gas flow restrictor with a ¼ inch fitting. Item 104 refers to an in line filter with ¼ inch fittings. Items 101, 102, 103 and 104 can all be connected with ¼ inch stainless steel tubing for example. Item 105 refers to an adapter that converts the ¼ inch tubing to ⅛ inch tubing. Item 106 refers to ⅛ inch stainless steel tubing that can be used to connect 105 to 106. Item 107 is a gas flow controller set to control the level of ammonia at 0.3 LPM (liters per minute). Item 108, an adapter that convers ¼ inch to ⅛ inch can be connected to item 107 on the ⅛ inch end and item 109 on the ¼ inch end. Item 109 can be a backflow preventor with ¼ inch fittings. ¼ inch stainless steel tubing 110 can be connected to a pressure gage 111. Additional ¼ inch stainless steel tubing 112 can be connected to item 113 that represents a fixed bed column with a flow rate of 0.3 LPM. After the fixed bed column 113, another pressure gage 115 can be connected with additional ¼ inch tubing 114. Item 116 represents a needle valve with ¼ inch fittings and item 117 represents an in-line filter with ¼ inch fittings. Polytetrafluoroethylene (PTFE) tubing, represented by 118 can connect the in-line filter 117 to a Drager $NH_3$ detector 119 (useful Drager $NH_3$ detectors can have a range from 0 to 300 ppm). Additional PTFE tubing 120 can then connect item 121 that is a bubble meter. The entire setup can be contained with a fume hood 122.

Figure 2:
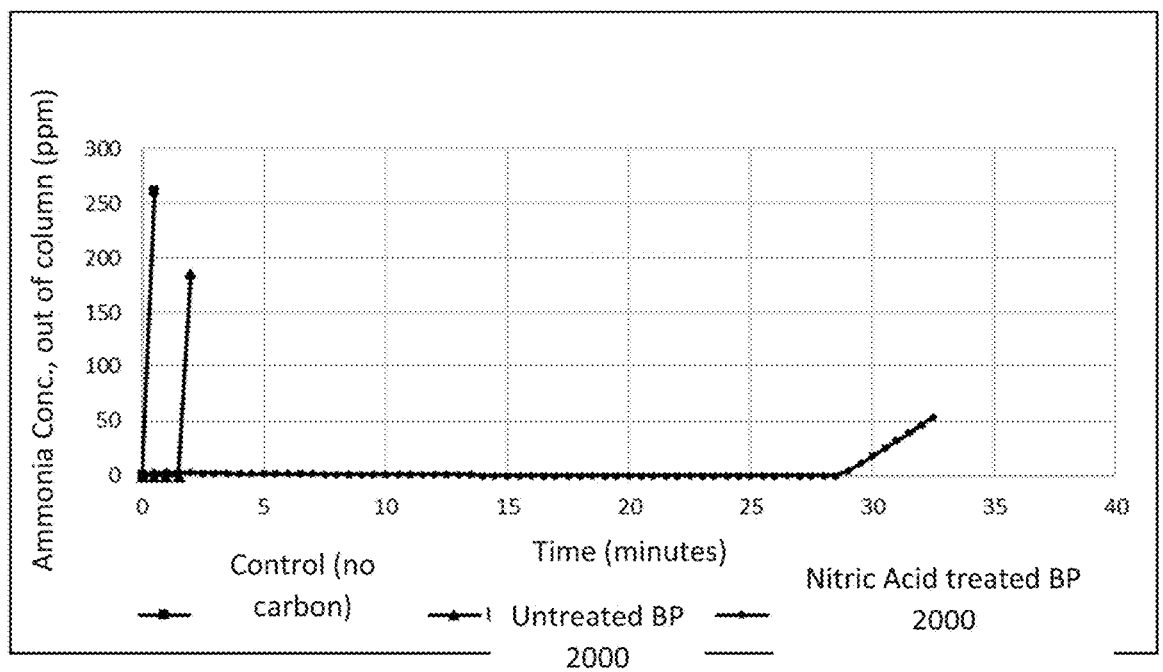
FIG. 2 is a representative Adsorption Column Breakthrough Curve and Control Run Results.

Testing consisted of loading the column with hydrochar, securing the column into the apparatus, noting initial conditions, and finally starting ammonia gas flow with a flow rate of 180 sccm. Upon initiating ammonia gas flow the ammonia detector after the column was monitored for breakthrough of ammonia concentration as can be seen in FIG. 2. FIG. 2 shows the ammonia concentration out of the column versus the time for a control run (no carbon), untreated BP 2000 and nitric acid treated BP 2000. Breakthrough was defined as an ammonia concentration out of the column that is 5% of the inlet concentration, or 50 ppm. A concentration of 1000 ppm ammonia was used to load the hydrochars with ammonia consistent with the ammonia concentration used in similar experiments.

Selected adsorption runs were immediately followed by desorption runs with air to determine if the captured ammonia was strongly held. Once ammonia concentration from the column reached the breakthrough concentration of 50 ppm, the ammonia gas flow was stopped. Then the mass flow controller input was changed from ammonia gas to air, which was passed through the column at the same volumetric flow rate as the ammonia gas and the outlet ammonia concentration was monitored.

2.8 Calculation of Ammonia Sorption Capacity

The performance of each hydrochar was evaluated by calculating a breakthrough capacity with the fixed bed adsorption column. During an adsorption run, three quantities are measured: the ammonia concentration of the gas out of the hydrochar loaded column, run time, and gas flow rate. Taken together, these quantities can be used to determine the mass of ammonia removed from the gas. The ratio of the mass of ammonia removed to the mass of hydrochar in the column is calculated and reported as the ammonia sorption capacity with units mg $NH_3$/g char.

3 Packed Bed Column Ammonia Sorption Testing 3.1 Adsorption Column Control Run

A control adsorption column run was completed with only steel wool in the column, no carbon material, to determine the time required for the ammonia to pass through the apparatus and reach the detector. These results (FIG. 2) show that the breakthrough concentration of 50 ppm ammonia is reached in under 30 seconds. Since this lag time is short relative to the duration of a typical run, which is 10-30 minutes, this lag time was neglected when calculating ammonia sorption capacity.

3.2 Commercial Activated Carbon Testing in Adsorption Column

An activated carbon, BP 2000, was tested for ammonia sorption capacity untreated and with a nitric acid treatment. Because the activated carbon is more uniform than hydrochars produced from biomass these results more clearly show the impact of nitric acid treatment for surface oxidation. Additionally, the curves with untreated BP 2000 and nitric acid treated BP 2000 are representative of breakthrough curves constructed in the course of hydrochar sorption capacity analysis. In the interest of space, these representative curves are the only breakthrough curves included in this report. Results in FIG. 2 show that the untreated activated carbon has low capacity to adsorb ammonia gas despite very high surface area of approximately 1400 $m^2/g^8$. After nitric acid treatment (6M nitric acid, 90° C.) the ammonia adsorption capacity increased to 10 mg/g. This supports previous research that has shown a strong correlation between the presence of acidic oxygen surface groups and ammonia sorption capacity.

3.3 Ammonia Sorption Capacity of Untreated Hydrochars

Figure 3:
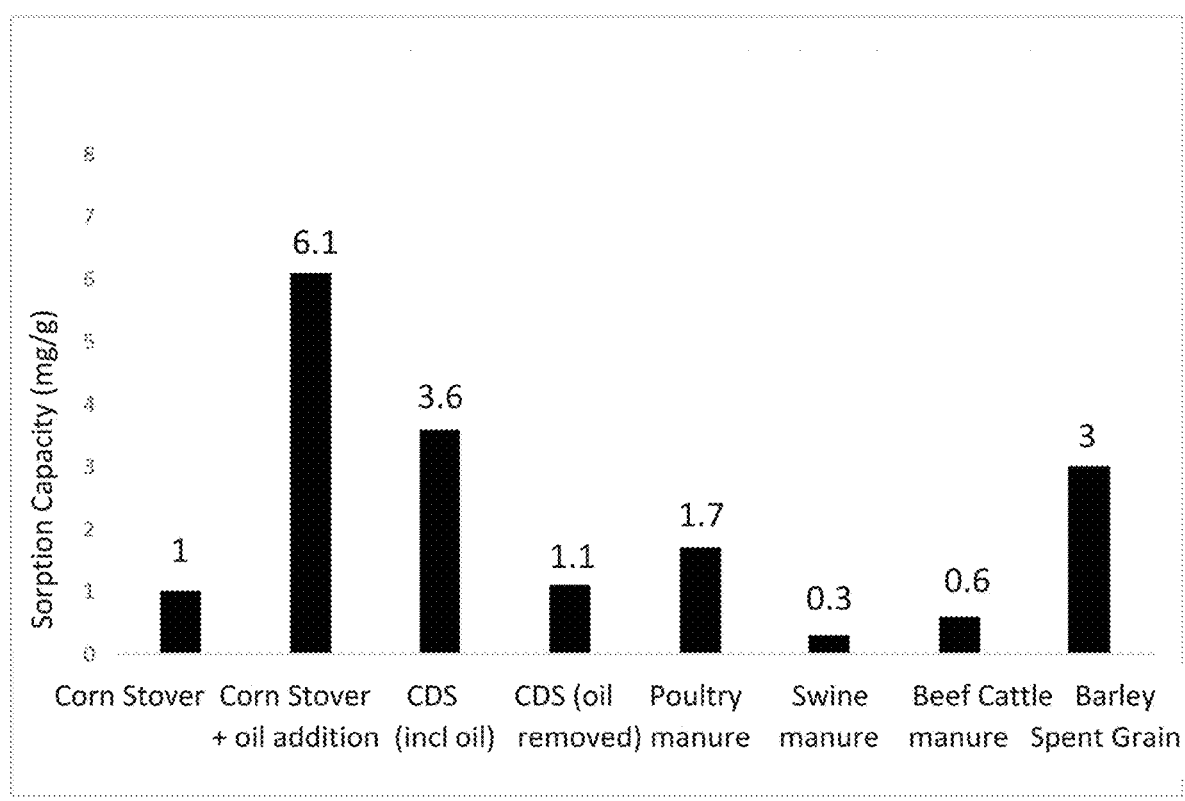
FIG. 3 shows Ammonia Sorption Capacities of Untreated Hydrochars from Various Biomass Feedstocks.

Untreated hydrochars are defined as those that were produced from only the noted biomass type and water in the reactor through hydrothermal carbonization. Additionally these chars were not altered after HTC processing with chemical treatments or metal additions, thus they represent the hydrochar produced with minimal processing steps and additional costs. Due to the high variability among the biomass types, these hydrochars have significantly different surface chemistries despite undergoing the same HTC process. Results presented in FIG. 3 show the ammonia sorption capacity of these hydrochars. FIG. 3 shows the ammonia adsorption capacity of hydrochars from various biomass sources with no post HTC processing. There were two sample which had a significantly higher ammonia sorption capacity than the other untreated hydrochars, those produced from CDS (including oil) and from brewers spent grains. There were two different CDS samples evaluated for ammonia sorption because one sample included oil while the other was collected after some of the oil was separated off. The high sorption in that sample may be due to a higher lipid content, which breaks down into fatty acids in the reactor. Boehm titration results determined a higher amount of carboxyl surface groups were present on that hydrochar, discussed further in section 4.1. This same mechanism may be responsible for the higher sorption capacity of the hydrochar derived from brewers spent grains because that feedstock also contains some lipids, which is consistent with literature findings.

3.4 Nitric Acid Treated Hydrochar Performance in Column

Figure 4:
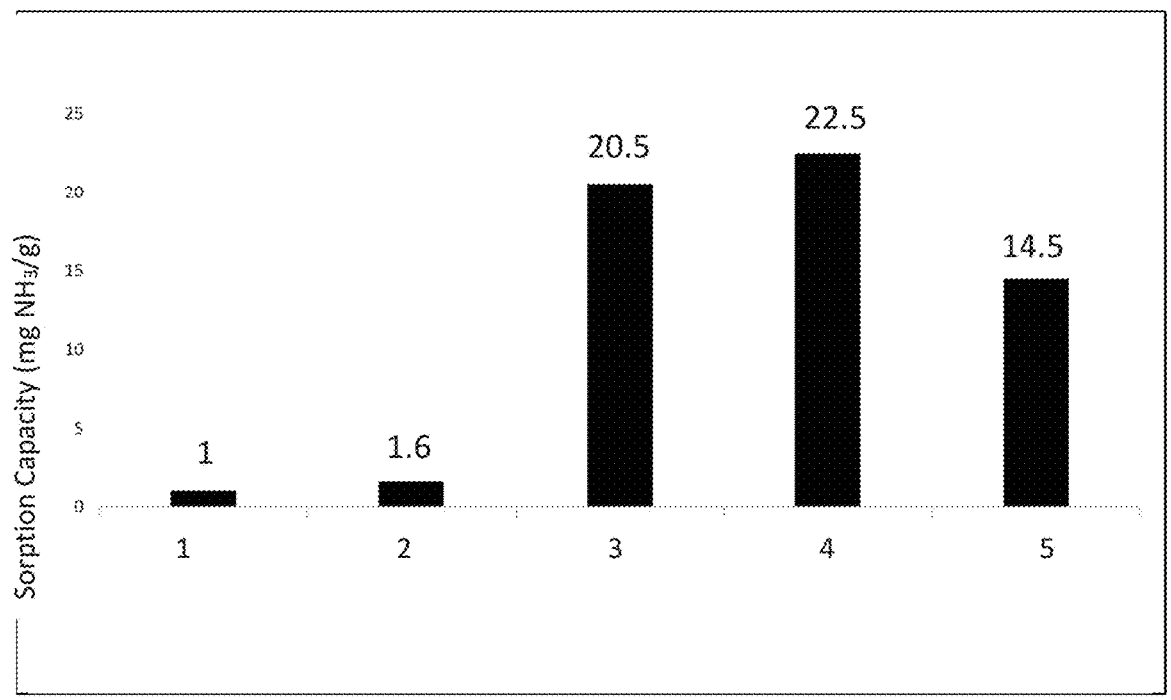
FIG. 4 shows Ammonia Sorption Capacities of Nitric Acid Treated Corn Stover Derived Hydrochars.

Corn stover derived hydrochars were subjected to nitric acid treatments with a range of treatment conditions including acid strength, temperature, and time. The adsorption column results for ammonia adsorption capacity are presented in FIG. 4 for four sets of testing conditions and a control untreated hydrochar. FIG. 4 shows the ammonia capacity versus various nitric acid treatment conditions. The results for row 1 are no treatment, row 2 are 3M nitric acid, for 1 hour at 20° C., row 3 are 3 M nitric acid for 1 hour at 90° C., row 4 are 6 M nitric acid for 1 hour at 90° C., and row 5 are 6 M nitric acid for 2 hours at 90° C. The results show the sorption capacity (mg $NH_3$/g char). It was determined that a nitric acid treatment at room temperature resulted in a sorption capacity increase of 0.6 mg $NH_3$/g char compared to an increase of 19.5 mg $NH_3$/g char for the 90° C. when time of reaction is held at 1 hour and nitric acid concentration is held at 3M. Once the importance of the treatment temperature was established, a higher concentration of 6M nitric acid was tested. The doubling of nitric acid concentration resulted in a modest increase in sorption capacity from 20.5 to 22.5 mg $NH_3$/g char. Lastly, a treatment time of 2 hours instead of 1 was tested. The higher time resulted in a hydrochar with a lower sorption capacity of 14.5 mg $NH_3$/g char. A possible explanation for this reduction is sorption capacity is that unstable acidic surface groups become replaced by more stable groups that do not contribute to ammonia sorption. It was found that nitric acid treatment at high temperature for 1 hour was highly effective at increasing ammonia sorption capacity. However, evolution of $NO_2$ gas was observed during the treatments, which is a harmful pollutant. The production of $NO_2$ during nitric acid treatment is a serious concern and must be considered as a cost for the increase is sorption capacity.

3.5 Ammonia Sorption Capacity of Corn Stover Hydrochar with Oil Addition

The hydrochar produced from a combination of corn stover and corn oil had the highest ammonia sorption capacity of hydrochars produced without metal addition or post HTC treatments, see FIG. 3. This result is consistent with the theory that oils break down under HTC conditions and result in a hydrochar with acidic surface groups (from the free fatty acids formed as the lipid degrades). These results are also consistent with the calculated ammonia sorption capacity of hydrochars derived from CDS that either contained corn oil or did not. In each case the presence of corn oil in the HTC reactor produced a hydrochar with higher ammonia sorption capacity. The feedstock composed of corn stover and oil may be preferable to CDS due to price and availability, in addition to the observed higher ammonia sorption capacity.

3.6 Metal Chloride Treated Hydrochar Performance in Column

Figure 5:
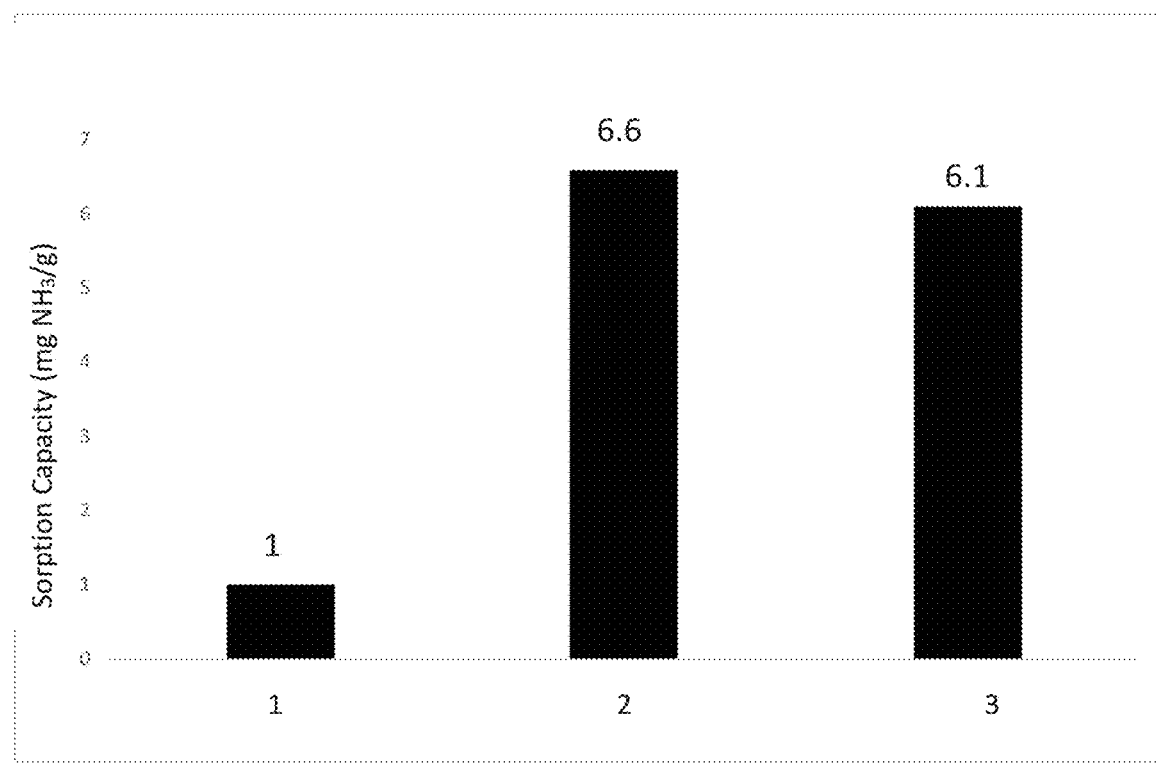
FIG. 5 shows Ammonia Sorption Capacities of Metal Treated Corn Stover Derived Hydrochars.
Figure 6:
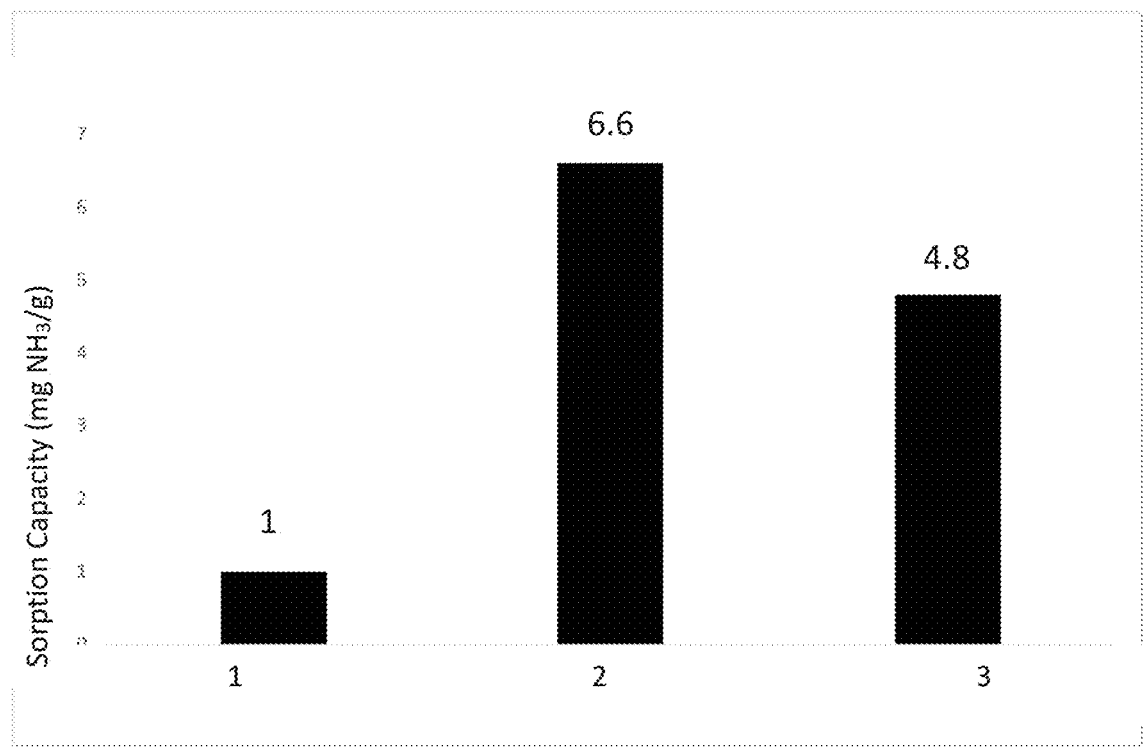
FIG. 6 shows Ammonia Sorption Capacities of Magnesium Chloride Treated Hydrochars.

Hydrochars were produced from corn stover with metal chloride added during the HTC process (in situ) with either $ZnCl_2$, $MgCl_2$, or process water containing $MgCl_2$ from a previous HTC experiment. The impact of the particular metal chloride used was less apparent, see FIG. 5. FIG. 5 shows the ammonia sorption capacity of hydrochars with in situ metal chloride treatment. Row 1 shows no treatment, row 2 shows $MgCl_2$ in situ treatment type and row 3 shows a $ZnCl_2$ in situ. FIG. 6 shows the ammonia sorption capacity of hydrochars with in situ magnesium chloride treatment or with recycled process water. Specifically, in FIG. 6, row 1 shows a hydrochar having no treatment, row 2 shows a hydrochar having $MgCl_2$ in situ treatment and row 3 shows a hydrochar having $MgCl_2$ recycled water treatment. The in situ treatment is interesting because it achieves a sorption capacity six times greater than an untreated corn stover hydrochar without introducing a new process step. Results from Boehm titration experiments found an increased amount of carboxyl surface groups on the in situ $MgCl_2$ treated hydrochar which may explain the disparity in ammonia sorption capacity, see section 4.1. However, more research is required to determine the mechanisms responsible for the increased concentration of acidic surface groups.

3.7 Desorption Testing

Certain hydrochars with high ammonia sorption capacity were subjected to desorption testing with air flow to determine if the ammonia which had adsorbed would be released. Results are presented in Table 1 for the amount of ammonia that was released under air flow. Two hydrochars were tested, a nitric acid treated hydrochar that released less than 5% of the adsorbed ammonia, while 26% was released from a metal chloride treated hydrochar. Based on these limited results it appears that most of the adsorbed ammonia is strongly held by the hydrochar and not readily released.

TABLE 1

Ammonia Desorption Testing Results

| Hydrochar Identification | Ammonia Sorption Capacity mg/g | Calculated Ammonia Desorption mg/g | Ammonia Retained % |
|---|---|---|---|
| Stover hydrochar - nitric acid treatment (3M, 90° C.) | 20.5 | 0.51 | 98 |
| Stover hydrochar - ZnCl2 in situ treatment | 6.1 | 1.6 | 74 |

Figure 7:
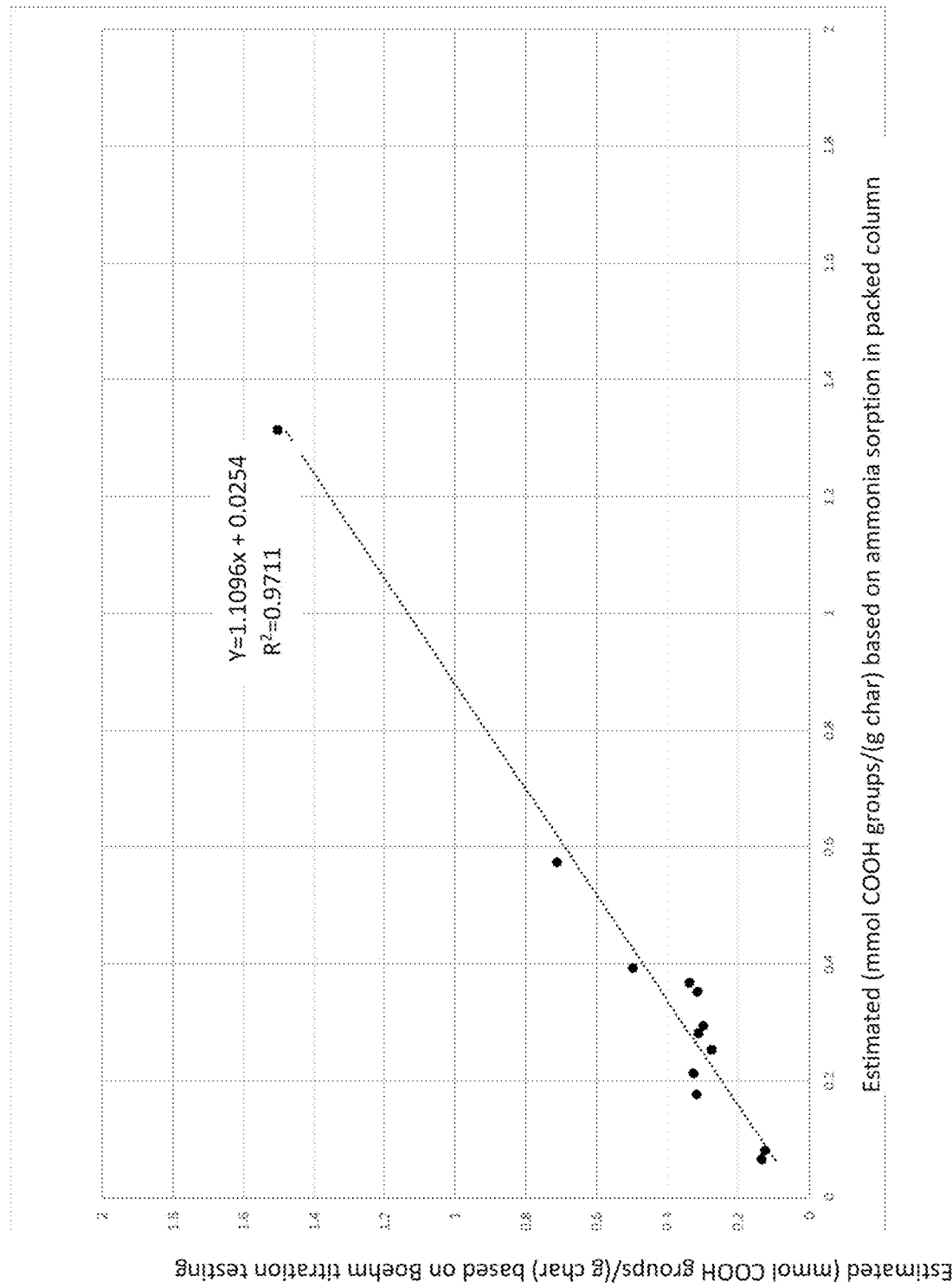
FIG. 7 shows Boehm Titration Estimated Carboxyl Group Concentration on Char surface Compared to Estimated Concentration Based on Ammonia Sorption Capability (see table 2 for exact values).

4 Evaluation of Hydrochar Surface Acidity with Boehm Titration 4.1 Boehm Titration All of the hydrochars discussed in this report were evaluated by a Boehm Titration experiment to quantify carboxyl surface groups. Alternative analysis methods can determine if carboxyl groups are present or not, but Boehm titration can quantify the number of groups. This testing was performed to investigate the theory that a hydrochar's capacity to adsorb ammonia is directly related to the number of carboxyl surface groups. A strong correlation was found between the ammonia sorption capacity of the hydrochars and the estimated quantity of carboxyl surface groups on the char, see FIG. 7 and Table 2. FIG. 7 shows the relationship between mmols ammonia sorbed in the column (x axis) vs. the estimated mmol carboxyl groups on the char surface as determined by Boehm Titration. If there was a directly proportional relationship between carboxyl groups and ammonia sorption then the best fit line through the data points would have a slope of 1.0, when a best linear fit line was made through the points a slope of 1.1 was calculated. There was good agreement between the different results, and the reason the slope is greater than 1 could be due to some of the carboxyl groups not being accessible to ammonia gas during the packed column testing. This supports the theory that carboxyl groups on a hydrochar are directly responsible for ammonia sorption, rather than another char characteristic such as surface area, and is consistent with literature findings. And that the sorption of ammonia occurs at a one to one ratio with carboxyl groups on a molar basis.

TABLE 2

Comparing Ammonia Sorption (mmol $NH_3$/g) to Boehm Titration Results (mmol COOH/g)

| Sample Description | Ammonia Sorption in Column Study (mmol ammonia captured per gram sample) | Boehm Titration Results (estimated mmol carboxylic acid groups per gram sample) |
|---|---|---|
| Stover Hydrochar, no additional treatment | 0.08 | 0.124 |
| Stover Hydrochar, corn oil added in situ | 0.368 | 0.336 |
| Stover Hydrochar, MgCl2 added in situ | 0.324 | 0.306 |
| Stover Hydrochar, MgCl2 recycled filtrate | 0.268 | 0.293 |
| Stover Hydrochar, ZnCl2 added in situ | 0.392 | 0.497 |
| Stover Hydrochar, nitric acid treatment | 1.315 | 1.504 |
| Brewers Spent Grains Hydrochar | 0.176 | 0.317 |
| CDS Hydrochar, low oil content | 0.065 | 0.134 |
| CDS Hydrochar, high oil content | 0.212 | 0.324 |
| BP 2000, nitric acid treatment | 0.574 | 0.714 |

Feedstock Lipid Content and Amount of Carboxyl Surface Groups on Hydrochar

It has been observed that feedstock materials which contain higher lipid content, CDS and Brewers spent grains, are converted into hydrochars with higher concentration of carboxyl surface groups in the hydrothermal carbonization process. This result is consistent with the theory that lipids are hydrolyzed during HTC treatment and deposited onto the hydrochar surface. This finding is important for ammonia sorption applications due to the relationship between carboxyl surface groups and sorption capacity as discussed in the previous section.

Disclosed hydrochars have the potential to capture harmful ammonia gas in a variety of applications with a lower cost than other materials which are currently available. Potential applications include agricultural field application, concentrated animal feeding operations, or for household pets. Hydrochars produced from multiple agricultural residues, which are available in large quantities, were shown to capture a significant amount of ammonia gas at ambient temperature and pressure. Multiple methods for producing these ammonia sorbing hydrochars have been outlined including applying hydrothermal carbonization to corn stover with oil addition, corn stover with a metal chloride treatment during hydrothermal carbonization, and hydrothermal carbonization of some lipid containing feedstocks without chemical addition.

One skilled in the art will appreciate that the methods and compositions described herein can be practiced with embodiments other than those disclosed. The disclosed embodiments are presented for purposes of illustration and not limitation. One will also understand that components of the methods depicted and described with regard to the figures and embodiments herein may be interchangeable.

The invention claimed is:

1. A method of removing ammonia from a gas, the method comprising:
   subjecting a composition comprising a stover composition to hydrothermal carbonization to form a hydrochar, the composition comprising an amount of lipids to provide a carboxyl group content in the hydrochar of not less than 0.3 millimoles (mmol) carboxyl groups per gram of hydrochar; and
   contacting the gas with the hydrochar, whereby the ammonia is adsorbed onto the hydrochar.

2. The method according to claim 1, wherein the stover composition comprises plant material from: corn, sorghum, soybean, rice, wheat, or any combination thereof.

3. The method according to claim 1, wherein the composition comprises corn stover, condensed distillers solubles (CDS), spent brewers grains, or any combination thereof.

4. The method according to claim 1, wherein the composition comprises one or more stover compositions and one or more added lipids.

5. The method according to claim 4, wherein the one or more added lipids comprise corn oil.

6. The method according to claim 1, wherein the carboxyl group content is not less than 0.4 millimoles (mmol) carboxyl groups per gram of composition.

7. The method according to claim 1, wherein the carboxyl group content can be determined using a Boehm titration.

8. The method according to claim 1 further comprising adding lipids to a stover composition to form the composition subjected to hydrothermal carbonization.

9. The method according to claim 8 further comprising desorbing the ammonia from the hydrochar.

10. The method according to claim 1, wherein the hydrothermal carbonization is done at a temperature from 180° C. to 220° C.

* * * * *